United States Patent [19]

Kan et al.

[11] Patent Number: 4,611,030

[45] Date of Patent: Sep. 9, 1986

[54] COMPOSITION FOR PNEUMATIC TIRES

[75] Inventors: Masanori Kan, Amagasaki; Hideo Fujiwara, Kyoto, both of Japan

[73] Assignee: Toyo Tire and Rubber Co., Ltd., Osaka, Japan

[21] Appl. No.: 715,477

[22] Filed: Mar. 25, 1985

Related U.S. Application Data

[63] Continuation-in-part of Ser. No. 461,573, Jan. 27, 1983, abandoned.

[30] Foreign Application Priority Data

Jan. 28, 1982 [JP] Japan .................................. 57-12931

[51] Int. Cl.$^4$ .......................................... C08F 299/00
[52] U.S. Cl. ........................................ 525/99; 525/196; 525/237; 525/314; 525/901
[58] Field of Search ............... 525/314, 901, 99, 196, 525/237

[56] References Cited

U.S. PATENT DOCUMENTS

| | | | |
|---|---|---|---|
| 3,393,182 | 7/1968 | Trepka | 526/82 |
| 3,639,517 | 2/1972 | Kitchen | 525/93 |
| 3,980,624 | 9/1976 | Minekawa | 526/173 |
| 3,985,830 | 10/1976 | Fetters | 526/21 |
| 4,163,765 | 8/1979 | Moczygemba | 525/314 |
| 4,307,218 | 12/1981 | Bingham | 525/314 |
| 4,396,743 | 8/1983 | Fujimaki | 525/99 |
| 4,417,027 | 11/1983 | Kan | 525/99 |
| 4,433,109 | 2/1984 | Takeuchi | 525/314 |
| 4,553,578 | 11/1985 | Vitus | 152/209 R |
| 4,575,534 | 3/1986 | Oshima | 525/99 |

*Primary Examiner*—John C. Bleutge
*Assistant Examiner*—Patricia Short
*Attorney, Agent, or Firm*—Koda and Androlia

[57] ABSTRACT

A composition for pneumatic tires including more than 30% of star shaped styrene-butadiene copolymers by solution polymerization with or without one or more types of natural rubbers or diene series synthetic rubbers. The composition value X of the solution polymerization star shaped SBR is obtained by the following equation.

$$X = \text{styrene content (\%)} + \frac{\frac{100 - \text{styrene content}}{100} \times \text{Vinyl content (\%) in BR}}{2}$$

wherein BR is the butadiene component and the vinyl content is the content of 1, 2 bonded butadiene in butadiene component. The value X falls in the range of the lower limit of 26 to the upper limit of 39. And the coupling efficiency of the solution polymerization star shaped SBR is more than 40%.

4 Claims, 4 Drawing Figures

LOW MOLECULAR    HIGH MOLECULAR

LOW MOLECULAR    HIGH MOLECULAR

LOW MOLECULAR    HIGH MOLECULAR

LOW MOLECULAR    HIGH MOLECULAR 4,611,030

COMPOSITION FOR PNEUMATIC TIRES

This is a continuation-in-part of application Ser. No. 461,573, filed Jan. 27, 1983, now abandoned.

BACKGROUND OF THE INVENTION

1. Field of the Invention

The present invention relates to a composition for pneumatic tires and particularly to a tire tread obtained by vulcanizing said composition to provide pneumatic tires well balanced among five characteristic properties, i.e., tire rolling resistance, wet grip performance, wear resistance, steering stability and crack resistance and more particularly to provide pneumatic tires especially improved in rolling resistance and wear resistance.

2. Prior Art

In general tire treads, styrene butadiene copolymers of the straight chain type obtained by emulsion polymerization were used in most cases. Styrene butadiene copolymers obtained by solution polymerization were also used, but with respect to the relationship between styrene content and vinyl content, the conventional styrene-butadiene copolymers were less in vinyl content (the vinyl content here means 1, 2 structure butadiene content in the butadiene component) and furthermore were insufficient in the balancing among the above mentioned five major characteristics.

The inventors have provided, in the prior Japanese patent application No. 56-73954 (U.S. patent application Ser. No. 358,871, now abandoned), a rubber composition for pneumatic tires well balanced among five characteristics. Said rubber composition includes more than 30% of star shaped styrene-butadiene copolymers by solution polymerization with or without one or more types of natural rubbers or diene series synthetic rubbers, the composition value X obtained by the following equation of said styrene-butadiene copolymers being in the range of 26–39:

$$X = \text{styrene content (\%)} + \frac{\frac{100 - \text{styrene content}}{100} \times \text{Vinyl content (\%) in BR}}{2}$$

wherein BR is the butadiene component and the vinyl content means the content of 1, 2 structure butadiene in butadiene component.

SUMMARY OF THE INVENTION

It is an object of the present invention to improve further our said prior invention and to provide a composition for pneumatic tires well balanced in five characteristics and particularly more improved in rolling resistance and wear resistance.

Accordingly, the subject of the present invention is also a rubber composition for pneumatic tires including more than 30% of star shaped styrene-butadiene copolymers by solution polymerization with or without one or more types of natural rubbers or diene series sybthetic rubbers, the composition value X obtained by the following equation of said styrene-butadiene copolymers being in the range of 26–39:

$$X = \text{styrene content (\%)} + \frac{\frac{100 - \text{styrene content}}{100} \times \text{Vinyl content (\%) in BR}}{2}$$

wherein BR is the butadiene component and the vinyl content means the content of 1, 2 structure butadiene in butadiene component.

In order to improve further rolling resistance and wear resistance, further investigation has been made in the present invention as to the relation between coupling efficiency and the molecular weight of said styrene-butadiene copolymer.

In addition, the styrene-butadiene copolymers are random copolymers having substantially the single glass transition temperature and the coupling efficiency of the styrene-butadiene copolymers, i.e. the ratio of a high molecular weight distribution in a two-crown part of a distribution graph of the molecular weight measured with gel permeation chromatography, is more than 40%. Furthermore, a single glass transition temperature is around $-59°$ C.

DETAILED DESCRIPTION OF THE INVENTION

As is apparent from the prior Japanese patent application No. 56-73954 (U.S. patent application Ser. No. 358,871), pneumatic tires well balanced among five characteristics are obtainable by employing the composition for pneumatic tires including more than 30% of star shaped styrene-butadiene copolymers by solution polymerization with or without one or more types of natural rubbers or diene series synthetic rubbers, the composition value X obtained by the following equation of said styrene-butadiene copolymers being in the range of 26–39:

$$X = \text{styrene content (\%)} + \frac{\frac{100 - \text{styrene content}}{100} \times \text{Vinyl content (\%) in BR}}{2}$$

wherein BR is the butadiene component and the vinyl content means the content of 1, 2 structure butadiene in butadiene component.

The styrene-butadiene copolymers utilized in the present invention are random copolymers having a single glass transition temperature. Furthermore, the coupling efficiency of the styrene-butadiene copolymers is more than 40% and the glass transition temperature is $-59°$ C., preferably.

The relationship between styrene content and vinyl content is preferably the same with that of the prior invention. Namely, a preferable styrene content in the copolymer is less than 20% and more preferably 10% to 20% because when the styrene content becomes less than 10%, the reduction of tensile strength occurs. It is preferably to keep the vinyl content not more than 50% because the increase in vinyl content (%) decreases wear resistance.

Reference is now made to the above described gel permeation chromatography (abb. GPC) of the copolymer.

Figure 1:
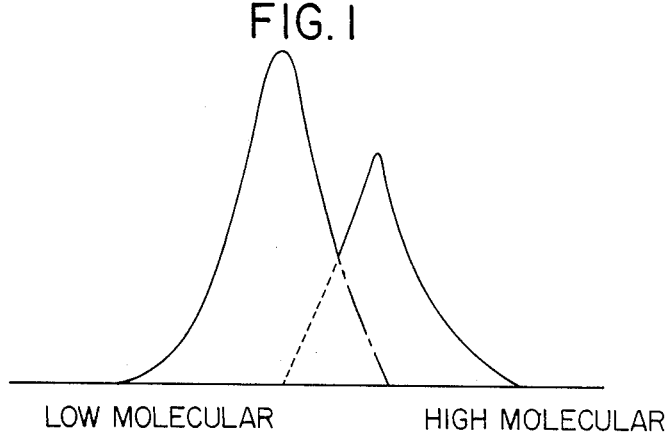
FIG. 1 is a distribution graph of molecular weight of a styrene-butadiene copolymer measured with gel permeation chromatography (GPC), FIG. 2-A is a distribution graph of molecular weight having low coupling efficiency, FIG. 2-B is a distribution graph of molecular weight having high coupling efficiency.
Figure 2A:
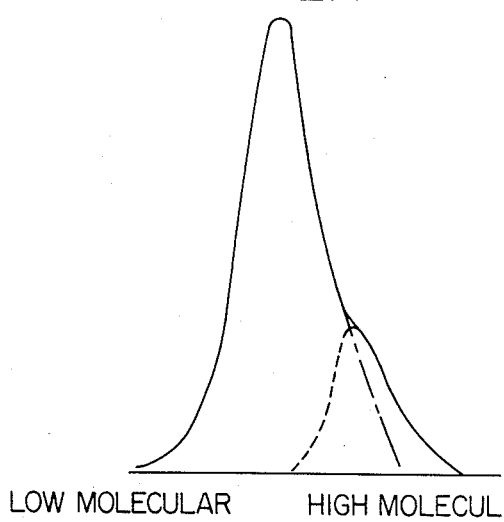
Figure 2B:
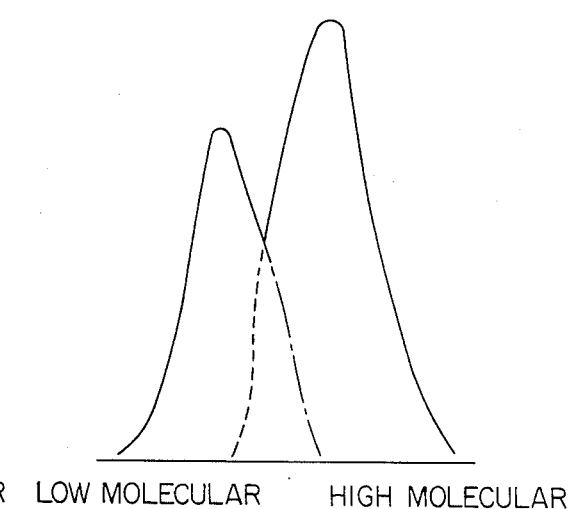

As shown in FIG. 1, a molecular weight distribution graph is composed of two crowns, one showing a low molecular portion, the other a high molecular portion. The bigger coupling efficiency is, the bigger the area of high molecular portion is. In the low molecular portion, coupling has not been taken place well. As shown in FIG. 2, if coupling efficiency is low, the distribution graph of molecular weight will be something like FIG. 2-A in which the area of low molecular portion is bigger than that of high molecular portion. If coupling efficiency is high, the graph will be something like FIG. 2-B in which the area of high molecular portion is bigger than that of the low molecular portion.

Figure 3:
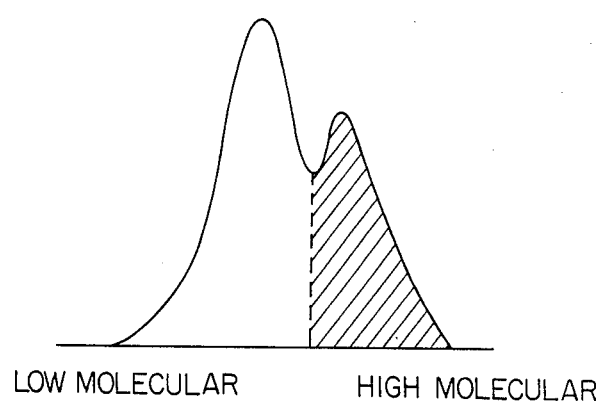
FIG. 3 is a graph showing a high molecular weight area by way of hatching in a distribution graph of molecular weight measured with gel permeation chromatography.

The area of high molecular portion is indicated by way of hatching in FIG. 3 which is differentiated from the area of low molecular weight by drawing a perpendicular line downward from a valley (inflection point) between the two crowns. Coupling efficiency (%), i.e., the ratio of the area of high molecular weight relative to the whole area, is defined as shown below;

$$\text{Coupling efficiency (\%)} = \frac{\text{Area of high molecular portion}}{\text{Whole area of molecular weight distribution}} \times 100$$

One example of how to make the copolymer of the present invention will now be described. In a reactor of 20 liter capacity which is provided with a stirrer and a cooler, 150 grams of styrene, 850 grams of 1,3 butadiene, 0.4 grams of n-butyl lithium, 5000 grams of hexane and 80 grams of tetrahydrofuran as a randomizer were added. A reaction was made for 3 hours at 60° C. while stirring the mixture. 0.7 grams of stannic chloride as a coupling agent was then added together with 500 grams of hexane and the reaction was continued for 2 hours. 5 grams of 2,4-diterbutyl-p-cresol as a stabilizer was then added into the mixture at coagulation was made by isopropyl alcohol. Obtained after drying was a random copolymer which had a styrene content of 15%, the content of the vinyl structure in the butadiene unit of 45% and the coupling efficiency of 51%.

The inventors have made investigation of and experiments on the influence of the coupling efficiency which gives on the above mentioned five characteristic properties of a tire.

The following Table 1 represents a composition employing a conventional emulsion polymerization styrene-butadiene rubber (SBR) as well as test results of properties for comparison purpose. The figures, 100, as to characteristics are index values for easy comparison with those of the embodiments according to the present invention.

TABLE 1

| | Sample No. 1 | | |
|---|---|---|---|
| Component | (Parts by Weight) | Characteristic Properties | |
| SBR 1502 | 100 | Glass Transition Point (Tg) °C. *1 | −59 |
| Carbon N-339 | 45 | Loss Modulus (E") E" × $10^{-7}$ dyne/cm$^2$ *2 | 1.16 |
| Higher Aromatic Oil | 5 | Wear Resistance *3 | 100 |
| ZnO | 3 | Wet Grip Performance *4 | 47(100) |
| Stearic Acid | 2 | Rolling Resistance *5 | 100 |

TABLE 1-continued

| | Sample No. 1 | | |
|---|---|---|---|
| Component | (Parts by Weight) | Characteristic Properties | |
| Aging Resistor (Antiozonant) (Santoflex 13) | 1.5 | Crack Resistance *6 | 100 |
| Accelerator CZ | 1.5 | Steering Stability *7 | 100 |
| Accelerator D | 0.2 | Composition Value X | 31 |
| S | 2 | Vinyl Content (%)/ Styrene Content (%) | 19/23.5 |

Note:
SBR 1502: Straight chain type of styrene-butadiene rubber obtained by emulsion polymerization, non-polutive, cold rubber, styrene bond content is 23.5.
Carbon N-339: Carbon black manufactured by Mitsubishi Chemical Industries, Ltd. N-339 is a type name provided by ASTM-D-1765, and is the carbon of HAF-HS-HT.
Age resistor (Antiozonant) (Santoflex 13): N—phenyl-N'—(1.3-dimethylbutyl)-P—phenylenediamine.
Accelerator CZ: N—cyclohexyl-2-benzothiazole-sulfonamide.
Accelerator D: Diphenylguanidine The respective characteristics shown in the foregoing tables were measured by the methods described below.

*1. Glass Transition Point (Tg) (C.°)

The glass transition point (Tg) was measured at 20° C. per minute as the heating up rate using a model DSG-2 manufactured by Perkin-Elmer Co.

*2. Loss modulus (E")

The loss modulus (E") was measured by using the dynamic viscoelasticity spectrometer manufactured by Iwamoto Seisakusho at 60° C. and 100 Hz.

*3. Wear Resistance

The wear resistance was measured in accordance with the provisions of ASTM-2228 using a Pico wear tester. The test value was substituted by the index value 100. In comparison, the higher the index value, the better the performance.

*4. Wet Grip Performance

The wet grip performance was measured by using a portable wet skid tester from Stanley Co. of England. The test value was obtained by forming a 1 mm thick water film over the testing surface prepared from dense grain size asphalt and by sliding a rubber test piece thereon. For comparison, the measured value and the index value 100 in parentheses are shown. The higher index value means better performance.

*5. Rolling Resistance

Tires of 185/70 HR 14 were prepared using the tire composition indicated in the table for tire treads and the performance was measured. In accordance with the Twinroll system in the measuring method described in Report of the U.S. Society of Automotive Engineering SAE No. 770875, the tire was mounted on a 5-J × 14 rim and the rolling resistance was measured at 2.2 kg/cm$^2$ of air pressure and 336 kg load. The test value is substituted by the index value 100. In comparison, smaller index represents more preferable performance.

*6. Cracking Property

This measurement was conducted by using a De Mattia machine (bending tester) and by following the JIS. A cycle value (the number of cycles counted) until the formation of a crack is indicated by way of the index value 100.

*7. Steering Stability

Using the same tires as those used on the foregoing rolling resistance test, driving test was conducted at 60 km/hr by setting up the tires on a vehicle and the feeling (feedback sensation) was measured and indicated by the index value 100.

Table 2 represents the embodiments of composition according to the present invention and other compositions for comparison purpose as well as the relationship between the characteristic properties and the efficiency in solution polymerization star shaped SBR.

TABLE 2

| Sample No. | 2 | 3 | 4 | 5 | 6 | 7 |
|---|---|---|---|---|---|---|
| Component |  |  |  |  |  |  |
| Solution Polymerization Star Shaped SBR | 100 | 100 | 100 | 100 | 100 | 100 |
| Carbon N-339 | 45 | 45 | 45 | 45 | 45 | 45 |
| Higher Aromatic Oil | 5 | 5 | 5 | 5 | 5 | 5 |
| ZnO | 3 | 3 | 3 | 3 | 3 | 3 |
| Stearic Acid | 2 | 2 | 2 | 2 | 2 | 2 |
| Aging Resistor (Antiozonant) (Santoflex 13) | 1.5 | 1.5 | 1.5 | 1.5 | 1.5 | 1.5 |
| Accelerator CZ | 1.5 | 1.5 | 1.5 | 1.5 | 1.5 | 1.5 |
| Accelerator D | 0.2 | 0.2 | 0.2 | 0.2 | 0.2 | 0.2 |
| S | 2 | 2 | 2 | 2 | 2 | 2 |
| Characteristic Property |  |  |  |  |  |  |
| Vinyl Content (%)/Styrene Content (%) | 48/15 | 48/15 | 48/15 | 48/15 | 45/15 | 45/15 |
| Coupling Efficiency (%) | 15 | 30 | 43 | 54 | 30 | 51 |
| Glass Transition Point (Tg) °C. | −58 | −58 | −58 | −58 | −59 | −59 |
| Loss Modulus (E") $E'' \times 10^{-7}$ dyne/cm$^2$ | 0.61 | 0.57 | 0.51 | 0.55 | 0.54 | 0.51 |
| Wet Grip Performance | 50.5 (107) | 51 (109) | 50 (106) | 50.5 (107) | 49.5 (105) | 49.0 (104) |
| Crack Resistance | 400 | 400 | 400 | 500 | 800 | 900 |
| Steering Stability | 112 | 113 | 111 | 112 | 111 | 111 |
| Rolling Resistance | 90 | 88 | 84 | 83 | 84 | 79 |
| Wear Resistance | 105 | 110 | 113 | 116 | 107 | 113 |
| Composition Value X | 35.4 | 35.4 | 35.4 | 35.4 | 34 | 34 |

The measurement of the respective characteristics was conducted in the same way as described with respect to Table 1. The test values of five characteristics were in indicated by way of index value in comparison with the index value 100 represented in Table 1.

As shown in Table 2, samples No. 2 to No. 5 have the same vinyl content/styrene content ratio of 48/15, but are different from each other in the coupling efficiency (%) which is 15, 30, 43 and 54 respectively. Comparing the values of rolling resistance of these four samples, samples No. 4 and No. 5 having the coupling efficiency of 43 and 54 respectively are lower in rolling resistance than that of samples No. 2 and No. 3 having the coupling efficiency of 15 and 30 respectively.

In the comparison of the value of rolling resistance in the samples No. 6 and No. 7 having vinyl content/styrene content ratio of 45/15, sample No. 7 having the coupling efficiency of 51 is lower in rolling resistance than that of sample No. 6 having the the coupling efficiency of 30.

It can be concluded from the above that the composition including a solution polymerization star shaped SBR whose coupling efficiency is more than 40% is superior in rolling resistance to the composition whose coupling efficiency is lower than 40%. It can be also recognized that higher coupling efficiency contributes the improvement in wear resistance.

Although it may be said that the coupling efficiency does not affect other characteristic properties of a tire, i.e., wet grip performance, crack resistance and steering stability, the improvements provided by our prior invention are also maintained.

Loss modulus (E") which is one of the characteristics related with rolling resistance becomes more preferable with the increase of coupling efficiency.

The influence of sorts of coupling agents on the characteristics of a tire will be shown in Table 3. The components of the samples in Table 3 are same as those shown in Table 2. Test results shown in Table 3 indicate that there is a difference in the influence upon the characteristic properties of a tire when a different coupling agent is applied to the samples comprising solution polymerization star shaped SBR having the same coupling efficiency of 51%. Comparison was made between the sample No. 7 in Table 2 whose coupling agent is stannic chrolide (SnCl$_4$) and new sample No. 8 whose coupling agent is silicon chrolide (SiCl$_4$).

TABLE 3

| Sample No. | 8 | 7 |
|---|---|---|
| Characteristic Property |  |  |
| Vinyl Content (%)/Styrene Content (%) | 45/15 | 45/15 |
| Coupling Agent | SiCl$_4$ | SnCl$_4$ |
| Coupling Efficiency (%) | 51 | 51 |
| Glass Transition Point (Tg) °C. | −59 | −59 |
| Loss Modulus (E") $E'' \times 10^{-7}$ dyne/cm$^2$ | 0.58 | 0.51 |
| Wet Grip Performance | 49.5 (105) | 49 (104) |
| Crack Resistance | 900 | 900 |
| Steering Stability | 101 | 111 |
| Rolling Resistance | 83 | 79 |
| Wear Resistance | 110 | 113 |
| Composition Value X | 34 | 34 |

Apparent from Table 3, the sample No. 8 employing silicon chrolide as a coupling agent is inferior to the sample No. 7 employing stannic chrolide as coupling agent especially in steering stability and rolling resistance.

With regard to Mooney viscosity of unvalcanized solution polymerization star shaped SBR according to the present invention, rolling resistance and wear resistance are improved by increasing Mooney viscosity, but higher viscosity is poor in processability. A preferable range of Mooney viscosity ML$_{1+4}$(100° C.) is 35 to 120, and more preferably 50 to 90.

It will be fully understood from the above descriptions that the solution polymerization star shaped styrene-butadiene copolymer whose composition value X is in the range of 26 to 39 and whose coupling efficiency is more than 40% can further improve wear resistance and rolling resistance while maintaining the improved characteristics in wet grip performance, crack resistance and steering stability attained by our prior invention.

It will be obvious to those skilled in the art that the components and the amount thereof other than the solution polymerization star shaped SBR are only for the purpose of description and not of limitation.

We claim:

1. A composition for pneumatic tires including more than 30% of star shaped styrene-butadiene copolymers by solution polymerization, with or without one or more types of natural rubbers or diene series synthetic rubbers, the composition value X obtained by the following equation of said styrene-butadiene copolymers being in the range of the lower limit of 26 to the upper limit of 39:

$$X = \text{styrene content (\%)} + \frac{100 - \text{styrene content}}{100} \times \frac{\text{Vinyl content (\%) in BR}}{2}$$

wherein BR being the butadiene component and the vinyl content being the content of 1, 2 bonded butadiene in butadiene component, said styrene-butadiene copolymers being random copolymers having substantially single glass transition temperature, the coupling efficiency of said styrene-butadiene copolymers in a two-crown part of a distribution graph of molecular weight measured with gel permeation chomatography being more than 40%, the styrene content is less than 20% and more than 10% and the vinyl content is less than 50%.

2. A composition for pneumatic tires according to claim 1, wherein the glass transition temperature is around $-59°$ C.

3. A composition for pneumatic tires according to claim 1, wherein the coupling agent for solution polymerization star shaped styrene-butadiene random copolymer is stannic chloride.

4. A composition for pneumatic tires according to claim 1, wherein Mooney viscosity, $ML_{1+4}(100°$ C.$)$, of unvulcanized solution polymerization star shaped styrene-butadiene random copolymer is in the range of 35 to 120.

* * * * *